United States Patent
Soucek et al.

(10) Patent No.: US 6,420,494 B1
(45) Date of Patent: Jul. 16, 2002

(54) CURABLE COATING COMPOSITION WITH SILOXANE REACTIVE DILUENTS

(75) Inventors: Mark D. Soucek; ShaoBing Wu, both of Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 0 days.

(21) Appl. No.: 09/671,399

(22) Filed: Sep. 27, 2000

Related U.S. Application Data

(62) Division of application No. 09/045,407, filed on Mar. 20, 1998, now Pat. No. 6,174,967.

(51) Int. Cl.$^7$ .................... B32B 27/38; C08L 63/00; C08L 83/06
(52) U.S. Cl. .................. 525/476; 428/413; 428/417; 428/418; 522/49; 522/62; 522/64; 522/146; 528/26; 528/27; 528/29
(58) Field of Search .................. 428/413, 417, 428/418; 522/49, 62, 64, 146; 525/476; 528/26, 27, 29

(56) References Cited

U.S. PATENT DOCUMENTS

| | | | |
|---|---|---|---|
| 3,932,339 A | 1/1976 | McLeod | 524/780 |
| 4,585,534 A | 4/1986 | Pasternack et al. | 522/31 |
| 4,593,051 A | 6/1986 | Koleske | 525/112 |
| 4,874,798 A | 10/1989 | Koleske et al. | 528/366 |
| 4,977,199 A | 12/1990 | Koleske et al. | 528/361 |
| 5,077,083 A | 12/1991 | Lutz et al. | 522/31 |
| 5,155,143 A | 10/1992 | Koleske | 528/26 |
| 5,366,768 A | 11/1994 | Kasari et al. | 427/407.1 |
| 5,376,420 A | 12/1994 | Yamamoto et al. | 525/477 |
| 5,389,727 A | 2/1995 | Nakai et al. | 525/101 |
| 5,408,001 A | 4/1995 | Nakahata et al. | 525/199 |
| 5,492,968 A | 2/1996 | Nakai et al. | 525/101 |
| 5,525,673 A | 6/1996 | Nakahata et al. | 525/104 |
| 5,593,731 A | 1/1997 | Akagi et al. | 523/410 |
| 5,609,918 A | 3/1997 | Yamaguchi et al. | 427/407.1 |
| 5,684,095 A | 11/1997 | Morimoto et al. | 525/438 |
| 5,719,234 A | 2/1998 | Yabuta et al. | 525/101 |

FOREIGN PATENT DOCUMENTS

| | | |
|---|---|---|
| EP | 0 222 582 A2 | 5/1987 |
| GB | 2 317 386 A | 3/1998 |
| JP | 3-190885 | 8/1991 |
| JP | 5-284098 | 4/1995 |
| SU | 855741 | 8/1981 |

OTHER PUBLICATIONS

"Compliant Coatings Based on Cycloaliphatic Epoxides and Tone® Polyols", Union Carbide Chemicals: 1–12 (1986).

"Cycloaliphatic Epoxy Systems", Union Carbide Chemicals and Plastics Company Inc: 1–28 (1989).

"Cyracure® Cycloaliphatic Epoxides: Cationic UV Cure", Union Carbide Chemicals and plastics Company Inc.: 1–24 (Apr. 1992).

"Formulating Ultraviolet Light–Cured Cyracure® Cycloaliphatic Epoxide Coatings", Union Carbide Chemicals and Plastics Company Inc.: 1–12 (1990).

"Tone® Polyol Reactive Diluents for High–Performance, Low–VOC Coatings", Union Carbide Corporation: 1–15 (1993).

"Tone® Polyols for High–Performance Urethane Elastomers and Adhesives", Union Carbide Corporation: 1–25 (1993).

Ali, K.M. et al., "Reactive Diluent Effect on Properties of UV–Cured Films", *Journal of Applied Polymer Science*, 54: 309–315 (1994).

Brennan, A.B. et al., "Structure–Property Behavior of Novel Ti/Poly (tetramethylene oxide) (PTMO) and Zr/PTMO Hybrid CERAMER Materials Prepared by the Sol Gel Method", *Journal of Inorganic and Organometallic Polymers*, 1(2): 167–187 (1991).

Crivello, J.V. et al., "The Synthesis and Study of the Photoinitiated Cationic Polymerization of Novel Cycloaliphatic Epoxides", *Journal of Polymer Science: Part A: Polymer Chemistry*, 33: 2463–2471 (1995).

Decker, C. et al., "Kinetic Study of the Cationic Photopolymerization of Epoxy Monomers", *Journal of Polymer Science: Part A: Polymer Chemistry*, 28: 3429–3443 (1990).

Huang, H.H. et al., "Ceramers: Hybrid Materials Incorporating Polymeric/Oligomeric Species with Inorganic Glasses by a Sol–Gel Process", *Polymer Bulletin*, 14: 557–564 (1985).

Koleske, J.V., "Copolymerization and Properties of Cationic, Ultraviolet Light–Cured Cycloaliphatic Epoxide Systems", from Conference Proceedings RADTECH '88: 353–371 (Apr. 25–28, 1988).

Koleske, J.V., "Mechanical Properties of Cationic Ultraviolet Light–Cured Cycloaliphatic Epoxide Systems", from Conference Proceedings RADTECH EUROPE '87: 1–12 (May 4–7, 1987).

Nabeth, B. et al., "Dynamic Mechanical Properties of UV–Curable Polyurethane Acrylate with Various Reactive Diluents", *Journal of Applied Polymer Science*, 60: 2113–2123 (1996).

*Primary Examiner*—Robert E. L. Sellers
(74) *Attorney, Agent, or Firm*—Merchant & Gould, P.C.

(57) ABSTRACT

A curable composition having an epoxy component and an organosilane component. The epoxy component includes at least one epoxy compound having two or more epoxide functional groups. The organosilane component includes at least one organosilane compound having two or more silyl ether groups. An exemplary organosilane compound is a siloxane-modified polyol.

20 Claims, 2 Drawing Sheets

CURABLE COATING COMPOSITION WITH SILOXANE REACTIVE DILUENTS

This application is a divisional of application Ser. No. 09/045,407, filed Mar. 20, 1998, U.S. Pat. No. 6,174,967, which application(s) are incorporated herein by reference.

BACKGROUND OF THE INVENTION

There has been considerable interest in the development of coating compositions with reduced amounts of volatile organic compounds (VOCs), particularly in light of regulations on VOC content. Ultraviolet (UV) curable coating compositions have emerged as one type of coating with reduced VOC content. Furthermore, many UV curable coating compositions offer the advantages of fast curing speed, high energy efficiency, and low capital investment and space requirements. These coatings are especially suitable for the wood/plastics coating (e.g., furniture), metal decorating, and paper printing industries.

The curing reaction of many UV curable coatings takes place at nearly ambient temperatures and, typically, no solvent or water evaporation is involved. There are two principle mechanisms for polymerizing UV coatings; free radical and cationic. In free radical initiated polymerization, free radicals are generated using either unimolecular photoinitiators (benziketals) or bimolecular photoinitiators (thioxanthones). Multi-functional acrylate esters are often used in this type of polymerization. Free radical polymerization, however, often exhibits oxygen inhibition of propagating radicals and acrylate monomers also represent odor and health hazard problems.

For cationic UV polymerization, typical initiators are salts which generate super acids or Bronsted acids under UV irradiation. Typical monomers/oligomers for the cationic coatings include, for example, vinyl ethers, propenyl ethers, and compounds having epoxide functional groups. These compounds can homopolymerize to form a coating.

Epoxide-containing compounds have fast cure response and the resulting cured coating is resistant to hydrolysis. In addition, aliphatic epoxide-containing compounds have excellent photostability. Epoxide-containing compounds, however, typically polymerize to form hard, brittle coatings. To increase the impact resistance, toughness, and flexibility of the cured coating, polyols have been added to the curable coating composition. The epoxide-containing compounds react with the polyols during the polymerization process.

Polyols act as reactive diluents in these curable coating compositions. Reactive diluents function as solvents to dilute viscous oligomers and reduce the overall viscosity of the curable coating composition. Reactive diluents also co-react with the monomer and oligomers to form integral films. Reactive diluents are typically compounds with relatively low molecular weights and multiple reactive functionalities. There is a need for the development of reactive diluents for use with epoxide-containing compounds to provide desired properties to films formed using UV curable coating compositions.

SUMMARY OF THE INVENTION

Generally, the present invention relates to epoxy-based curable coatings. More particularly, the present invention is related to epoxy-based curable coatings having a reactive diluent that includes an organosilane compound. One embodiment of the invention is directed to a curable composition having an epoxy component and an organosilane component. The epoxy component includes at least one epoxy compound having two or more epoxide functional groups. The organosilane component includes at least one organosilane compound having two or more silyl ether groups.

Another embodiment of the invention relates to a polymeric composition formed by the reaction, in the presence of a photoinitiator, between an epoxy component and an organosilane component. The epoxy component has at least one epoxy compound with two or more epoxide functional groups. The organosilane component has at least one organosilane compound with two or more silyl ether groups.

Yet another embodiment of the invention provides a reactive diluent for a curable composition. The reactive diluent includes a compound having the formula:

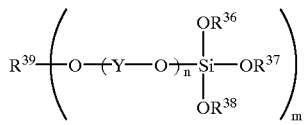

where $R^{36}$–$R^{38}$ are all or cycloalkyl, $R^{39}$ is alkylene, Y is —C(O)—$R^{40}$—, —C(O)—$R^{41}$—C(O)—$R^{42}$ or —$R^{43}$—, $R^{40}$–$R^{43}$ are alkylene, n and m are integers, n is 1 or more, and m is 2 or more. This reactive diluent is a suitable example of an organosilane compound with two or more silyl ether groups.

A further embodiment of the invention relates to a coated substrate including a substrate and a coating on at least one surface of the substrate. The coating includes a product of a reaction, in the presence of a photoinitiator, between a) an epoxy component having at least one epoxy compound with two or more epoxide functional groups and b) an organosilane component having at least one organosilane compound with two or more silyl ether groups.

Another embodiment of the invention provides a method for coating a substrate that includes coating a surface of the substrate with a coating composition. The coating composition includes a) an epoxy component having at least one epoxy compound with two or more epoxide functional groups, b) an organosilane component having at least one organosilane compound with two or more silyl ether groups, and c) a photoinitiator. The coating composition is cured after application to a substrate surface to form a coating.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
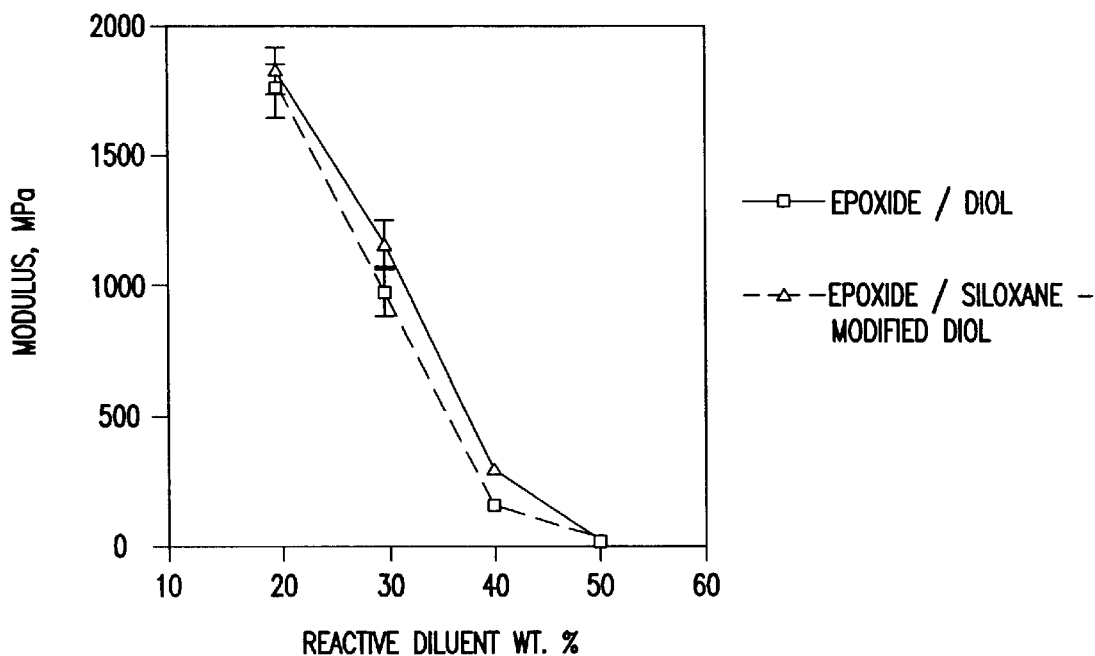
FIG. 1 is a graph of the tensile modulus for coating compositions including a diol reactive diluent (open squares and dotted lines) or a siloxane-modified diol reactive diluent (closed triangles and solid lines)

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to the formation of epoxide-based curable coating compositions, films, and coatings. In particular, the present invention is directed to epoxide-based curable coating compositions which include a reactive diluent material with at least one organosilane compound. The organosilane compound may be, for example, a compound having two or more silyl ether groups, such as a siloxane-modified polyol. While the present invention may not be so limited, an appreciation of various aspects of the invention will be gained through a discussion of the examples provided below.

The coating compositions of the present invention include (a) an epoxy component having at least one compound with at least two epoxide groups and (b) a flexible reactive diluent material that includes at least one organosilane compound. Suitable organosilane compounds include compounds having at least two silyl ether groups, such as a siloxane-modified polyol. The flexible reactive diluent material may optionally include one or more compounds having at least two hydroxyl groups, such as apolyol.

A film or coating is formed via catalyzed polymerization involving the epoxide compound and the reactive diluent. The polymerization typically involves homopolymerization of both the epoxy component and the reactive diluent material, as well as copolymerization of the epoxy component and the reactive diluent material. The polymerization reaction is typically catalyzed by a cationic initiator. Suitable examples of such initiators include compounds that form superacids via photolysis under UV irradiation.

The coatings or films formed using the curable coating compositions of the invention, particularly those which are formed using cycloaliphatic epoxides, often have excellent weatherability, as well as good mechanical and electrical insulation properties. The coatings or films formed by polymerization of the coating composition have a number of uses. The coatings or films can be used, for example, as barrier coatings for polyolefin substrates, protective coatings for can ends, and conformal coatings in the electrical industry. In addition, the cured coatings or films may be used for coating wood, metal, paper, and plastic substrates. Examples of suitable uses include automobile finishes, can finishes, appliance finishes, machine finishes, house siding, metal finishes, printing inks, and the like.

Epoxy Component

The epoxy component typically includes at least one compound have two or more epoxide groups. Preferably, the compound has two epoxide functional groups. A variety of epoxide compounds having at least two epoxide groups can be used. The epoxide groups can be terminal epoxide groups or internal epoxide groups. The epoxide compounds may be, for example, cycloaliphatic epoxides, such as compounds prepared by, for example, epoxidation of polycyclic alkenyls using organic peracids or hydrogen peroxide. Other epoxide compounds include, for example, glycidyl epoxides, aliphatic epoxides, epoxy cresol novolac resins, epoxy phenol novolac resins, polynuclear phenol glycidyl ether-derived resins, aromatic and heterocyclic glycidyl amine resins, hydantoin epoxy resins, epoxides of natural oils, such as soybean and linseed oils, and the like. Examples of suitable epoxide compounds for use in the present coating compositions are described in U.S. Pat. Nos. 4,593,051, 4,874,798, and 4,977,199, incorporated herein by reference.

Suitable epoxide compounds include cycloaliphatic epoxides and aliphatic epoxides, as well as aromatic, cycloaliphatic, and aliphatic glycidyl epoxides, and the like. Preferred epoxide compounds include compounds having a cyclic group, such as a cycloaliphatic or aromatic group. More preferred epoxide compounds include cycloaliphatic epoxides and aromatic or cycloaliphatic glycidyl epoxides. The most preferred epoxide compounds include an epoxycycloalkyl group.

Suitable cycloaliphatic epoxides include those having the general formula:

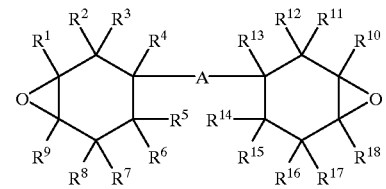

where $R^1$ to $R^{18}$, which can be the same or different, are H or alkyl and A is O or

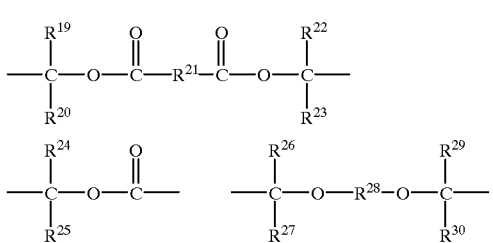

where $R^{19}$, $R^{20}$, $R^{22}$–$R^{27}$, $R^{29}$, and $R^{30}$ are hydrogen or alkyl, and $R^{21}$ and $R^{28}$ are alkylene functional groups. The alkyl groups typically have no more than eight carbon atoms. Alternatively, A and $R^{13}$ can be combined to form:

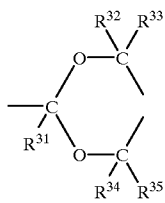

where $R^{31}$ to $R^{35}$ are hydrogen or aklyl. The alkyl groups typically have no more than eight carbon atoms.

$R^1$–$R^{20}$, $R^{22}$–$R^{27}$ and $R^{29}$–$R^{35}$ are preferably H, methyl, ethyl, or isopropyl. More preferably, $R^1$–$R^{20}$, $R^{22}$–$R^{27}$ and $R^{29}$–$R^{35}$ are H. $R^{21}$ and $R^{28}$ are preferably C1–C12 branched or straight-chain alkylene, and, more preferably, C2–C8 branched or straight-chain alkylene.

Examples of suitable cycloaliphatic epoxides include bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate, 3,4-epoxycyclohexylmethyl-3,4-epoxycyclohexane carboxylate, 3,4-epoxy-1-methylcyclohexylmethyl-3,4-epoxycyclohexane carboxylate, 3,4-epoxy-1-methylcyclohexylmethyl-3,4-epoxy-1-methylcyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, and 2-(3,4-epoxycyclohexyl-5,5-spiro-3,4-epoxy)cyclohexane-meta-dioxane. Preferred cycloaliphatic epoxides include 3,4-epoxycyclohexylmethyl-3,4-epoxycyclohexane carboxylate, bis(3,4-epoxy-6-methylcyclohexylmethyl) adipate, or 2-(3,4-epoxycyclohexyl-5,5-spiro-3,4-epoxy)cyclohexane-meta-dioxane.

Other suitable cycloaliphatic epoxides include, for example:

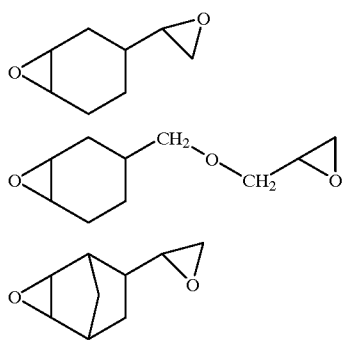

and alkyl substituted derivatives thereof and fused ring cycloaliphatic epoxides, such as:

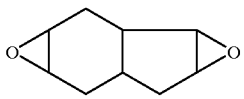

and alkyl substituted derivatives thereof.

Other epoxides include glycidyl esters, such as, for example,

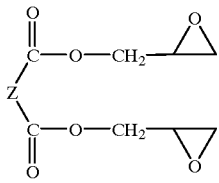

and glycidyl ethers, such as, for example

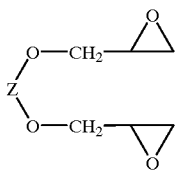

where Z is phenyl, alkyl-substituted phenyl, bisphenol A, cyclohexane, cyclohexene, alkyl substituted derivatives thereof, and the like.

Reactive Diluent

Although the epoxides can homopolymerize, the resulting films are typically brittle. A reactive diluent material is added to the coating composition to alter the viscosity of the coating composition and to copolymerize with the epoxide compound. The addition of a flexible reactive diluent material often produces a more flexible and impact resistant coating or film. Typically, reactive diluents are flexible molecules with functional groups that are capable of reacting with the epoxide groups of epoxide compounds. The coating compositions of the present invention include at least one organosilane reactive diluent, such as a compound with at least two silyl ether groups. Preferred organosilane reactive diluents include siloxane-modified polyols, in which at least two of the hydroxyl groups of the polyol are functionalized with silyl ether groups. The coating compositions of the present invention may optionally include reactive diluents with two or more hydroxyl groups, such as polyols.

The reactive diluent generally acts as a solvent for the coating composition, so that little or no additional solvent is needed, thereby reducing the need for VOCs in the coating compositions. Typically, the reactive diluent is a low molecular weight compound with multiple reactive functionalities. Preferably, the reactive diluent is also characterized by low toxicity, low volatility, low odor, and compatible solubility.

In some cases, the reactive diluent, such as a siloxane-modified polyol may be more viscous than the epoxide compound used in the coating composition. In such cases, the epoxide compound may also act as a diluent.

Organosilane Reactive Diluents

An organosilane compound is used in the coating composition as a reactive diluent. The organosilane compound typically has at least two silyl ether groups. Exemplary compounds include siloxane-modified polyols in which at least two of the hydroxyl groups of a base polyol are modified to have the following formula:

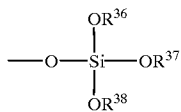

where $R^{36}$–$R^{38}$ are alkyl. Preferably, $R^{36}$–$R^{38}$ are C1–C6 alkyl. More preferably, $R^{36}$–$R^{38}$ are methyl, ethyl, or isopropyl.

Suitable siloxane-modified polyols include polyether or polyester polyols (i.e., hydroxy functional polyethers or polyesters) having the formula:

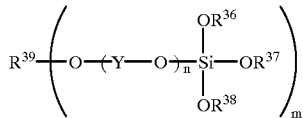

where $R^{36}$–$R^{38}$ are alkyl or cycloalkyl, $R^{39}$ is alkylene, Y is —C(O)—$R^{40}$—, —C(O)—$R^{41}$—C(O)—$R^{42}$ or —$R^{43}$—, $R^{40}$–$R^{43}$ are alkylene, n and m are integers, n is 1 or more, and m is 2 or more. Preferably, $R^{36}$–$R^{38}$ are C1–C6 alkyl. More preferably, $R^{36}$–$R^{38}$ are methyl, ethyl, or isopropyl. Preferably, $R^{39}$ is C2–C20 alkylene and, more preferably, C2–C10 alkylene. Preferably, $R^{40}$–$R^{43}$ are C1–C16 alkylene. More preferably, $R^{40}$ and $R^{41}$ are C4–C10 alkylene and $R^{42}$ and $R^{43}$ are C2–C4 alkylene. Preferably, n is an integer ranging from 1 to 8 and, more preferably, ranging from 2 to 6. Preferably, m is 2, 3, or 4.

Particularly suitable siloxane-modified polyols include polyols where Y is —C(O)—$R^{40}$— and $R^{40}$ is C3–C8 alkylene. More particularly, useful polyols include those in which $R^{40}$ is C4–C6 alkylene.

The siloxane-modified polyols are typically derived from, or have the same structure as a compound derived from, a polyol having the formula:

These polyols can be modified by addition of a siloxane functionality to at least two of the hydroxyl groups of the polyol to form the siloxane-modified polyols for use as a reactive diluent.

Suitable polyols include, for example, polyether and polyester polyols. Examples of these polyols include polycaprolactone polyols, polymethylcaprolactone polyols, polyvalerolactone polyols, polyethylene oxide polyols, polypropylene oxide polyols, polybutylene oxide polyols, polyhydroxyalkane polyols, and polyoxyalkylene polyols. Additional polyols and methods for making the polyols are described in U.S. Pat. Nos. 4,593,051, 4,874,798, and 4,977,199, incorporated herein by reference. Preferred polyols for making siloxane-modified polyols include polycaprolactone polyols, polymethylcaprolactone polyols, polyvalerolactone polyols, and polybutylene oxide polyols. The most preferred polyols include polycaprolactone polyols.

Particularly useful polyols for making siloxane-modified polyols include caprolactone polyols (i.e., Y is —C(O)—$C_5H_{10}$—), such as those available commercially from Union Carbide (Danbury, Conn.) as Tone® Series polyols. In particular, suitable caprolactone polyols include Tone® 0200 ($M_n$=530), 0201 ($M_n$=530), and 0210 ($M_n$=830) diols (m=2) and Tone® 0301 ($M_n$=300), 0305 ($M_n$=540), and 0310 ($M_n$=900) triols (m=3), where $M_n$ is the number average molecular weight of the caprolactone polyol.

In some embodiments, the molecular weight of the polyol, from which the siloxane-modified polyol is derived, is limited. Typically, as the molecular weight of a reactive diluent material increases, the viscosity of a coating composition using the reactive diluent also increases. Thus, the molecular weight of the reactive diluent may be limited by the desired viscosity. (Alternatively, a solvent may be added to reduce the viscosity or the epoxide compound may act as a diluent.) In addition, the use of a higher the molecular weight reactive diluent material typically results in a lower crosslinking density. In these embodiments, the preferred reactive diluents have a number average molecular weight, $M_n$, of 1100 or less, and, more preferably, have a molecular weight ranging from 450 to 600. Examples of suitable polyols within this range include Tone® 0201 and Tone® 0305.

The siloxane-modified polyols may be formed, for example, by reacting a polyol with an alkoxysilane, and preferably, a tetraalkoxysilane. Suitable tetralkoxysilanes include, for example, tetraethyl orthosilicate (i.e., TEOS or tetraethoxysilane), tetramethyl orthosilicate, tetrapropyl orthosilicate, and tetrabutyl orthosilicate. Typically, the polyol and alkoxysilane are combined in a vessel and allowed to react. A catalyst, for example, a Lewis or Bronsted acid, is often added to facilitate the reaction. Suitable catalysts include, for example, tin compounds such as dibutyltin dilaurate.

The reaction of the polyol and alkoxysilane is typically conducted at a temperature between about 20° C. and about 200° C. and, preferably, between about 90° C. and about 170° C. If the reaction is conducted at a temperature that is too low, the reaction will proceed very slowly. If the temperature is too high, there may be an increase in the amount of side reaction products. The reaction time varies depending on a number of factors including, for example, the reactants, the catalyst, and the temperature.

The reacting step is typically carried out in an aprotic solvent which includes at least one of the following: a halogenated paraffin, benzene, a substituted benzene, or a saturated ether. The reacting step is preferably carried out in a solvent including at least one of the following: xylene, benzene, toluene, petroleum ether, diethyl ether, dichloromethane, chloroform, or 1,2-dichloroethane.

The reaction is typically conducted under an anhydrous atmosphere and in the absence of oxygen. Preferably, the reaction is conducted under a relatively inert atmosphere, such as nitrogen or argon. In addition, the reactants are often purged with nitrogen for a period of time before the reaction to remove oxygen and/or water.

In the reaction the typical equivalent ratio of polyol compound to alkoxysilane ranges from 5:1 to 1:5. Preferably the ratio of polyol compound to alkoxysilane ranges from 2:1 to 1:2. Moreover, large amounts of catalyst are usually unnecessary to speed the reaction and instead only increase the cost. Insufficient catalyst may not increase the reaction rate and may lead to an increase in the amount of side products.

Polyols

The reactive diluent material of the coating compositions may optionally include at least one polyol, such as an aliphatic polyol (e.g., a hydroxy-functional polyester or polyether). The polyol in the coating composition may be the same as the polyol from which the siloxane-modified polyol was derived or may be different. Suitable polyols include those described above for generation of the siloxane-modified polyols. These include polycaprolactone polyols, polymethylcaprolactone polyols, polyvalerolactone polyols, polyethylene oxide polyols, polypropylene oxide polyols, polybutylene oxide polyols, polyhydroxyalkane polyols, and polyoxyalkylene polyols. Additional polyols and methods for making the polyols are described in U.S. Pat. Nos. 4,593,051, 4,874,798, and 4,977,199, incorporated herein by reference.

Preferred polyols include polycaprolactone polyols, polymethylcaprolactone polyols, polyvalerolactone polyols, and polybutylene oxide polyols. The most preferred polyols are polycaprolactone polyols (i.e., Y is —C(O)—$C_5H_{10}$—). Suitable caprolactone polyols are available commercially from Union Carbide (Danbury, Conn.) as Tone® Series polyols. In particular, the preferred caprolactone polyols include Tone® 0200, 0201, 0210, 2221, 0230, 0240, 0240HP, 0249, 2241 and 0260 diols (m=2) and Tone® 0301, 0305, and 0310 (triols (m=3). The more preferred caprolactone polyols include Tone® 0200, 0201, 0210, 0230, 2221, 0301, and 0305. The most preferred caprolactone polyols include Tone® 0201 and 0305.

Initiators

Typical initiators for the polymerization of the epoxy component and reactive diluent material include photoinitiators and, particularly, cationic photoinitiators that generate cationic catalysts, such as a Bronsted or Lewis acid, upon exposure to activating radiation. Typical types of activating radiation include ultraviolet light, visible light, X-rays, gamma rays, electron beams, and the like. The initiator may be used in any amounts, however, if an increased cure rate is not necessary, than a reduced amount of initiator is often sufficient.

Suitable initiators include, for example, triarylsulfonium salts, diaryliodonium salts, aryldiazonium salts, metal fluoroborates, a complex of boron trifluoride (as described in U.S. Pat. No. 3,379,653, incorporated herein by reference), a bisperfluoroalkylsulfonyl) methane metal salt (as described in U.S. Pat. No. 3,586,616, incorporated herein by reference), an aromatic onium salt of Group VIa elements (as described in U.S. Pat. No. 4,058,400, incorporated herein by reference), an aromatic onium salt of Group Va elements (as described in U.S. Pat. No. 4,069,055, incorporated herein by reference), a dicarbonyl chelate of a Group IIIa–Va element (as described in U.S. Pat. No. 4,086,091, incorporated herein by reference), a thiopyrillium salt (as described in U.S. Pat. No. 4,139,655, incorporated herein by reference), or a Group VIa element having an $MF_6$ anion where M is P, As, or Sb. Additional initiators are described in U.S. Pat. No. 4,977,199, incorporated herein by reference.

Particularly suitable indicators include triarylsulfonium, diarylsulfonium, or aryldaizonium salts. Preferred initiators include triarylsulfonium salts, such as triarylsulfonium hexafluoroantimonate, triarylsulfonium hexafluoroarsenate, and triarylsulfonium hexaphosphate salts. Commercial triarylsulfonium salts include UVI-6974 (a mixture of triarylsulfonium hexafluoroantimonate salts) and UVI-6990 (a mixture of triarylsulfonium hexafluorophosphate salts) from Union Carbide (Danbury, Conn.).

The cationic catalyst may be formed by either homophotolytic or heterophotolytic cleaving of the initiator. Homophotolysis to form a cationic catalyst is exemplified by the formation of a super acid from a triarylsulfonium salt by the following mechanism:

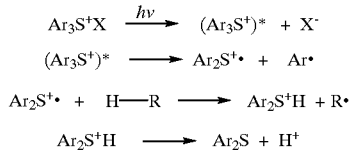

where $X^-$ is $AsF_6^-$, $SbF_6^-$, or $PF_6^-$ and H–R is a proton donor compound. Heterophotolysis is exemplified by the following mechanism:

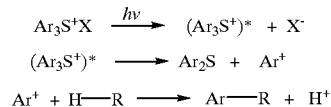

The cationic catalyst (e.g., an $H^+$ ion) formed by either the homophotolysis or heterophotolysis of the initiator is then available to catalyze the polymerization of the components in the coating composition.

Curing the Coating Composition

Although the compositions have been described as being cured by exposure to ultraviolet light, other types of electromagnetic radiation may be used to cure at least some coating compositions of the invention. Suitable types of electromagnetic radiation include, for example, gamma rays, X-rays, electron beams, ultraviolet light, and visible light.

A number of reactions are believed to occur when the initiator is photolyzed, as illustrated by the mechanisms above. One set of proposed reactions involves the homopolymerization of the epoxide compound by catalyzed addition reactions. This homopolymerization of the epoxide compound is thought to produce ether linkages between epoxide compounds. It is thought that the siloxane-modified polyol can also undergo homopolymerization to form a siloxane matrix.

While some of the components of the coating composition may homopolymerize, it is believed that at least some copolymerization takes place. This results in crosslinking between the components of the coating composition. For example, it is believed that the siloxane-modified polyol and the optional polyol undergo copolymerization with the epoxide compound. It has been proposed that the siloxane-modified polyols can be protonated in the presence of the cationic catalyst. These protonated siloxane-modified polyols can then react with the epoxide groups of the epoxide compound to form ether linkages.

The curing, and preferably, crosslinking, of the coating composition forms a coating or film. The aromatic or cycloaliphatic groups of the epoxy component provide the coating or film with a strong, hard surface. The flexible portions of the organosilane and optional polyol reactive diluent materials (e.g., aliphatic portions of a siloxane-modified polyol or unmodified polyol) provide a flexibility to the coating or film to increase the durability and impact resistance of the film.

Curable Coating Compositions

The ratio of components in the curable coating compositions of the present invention can vary. Typically, the reactive diluent is about 5 to 80 wt. % of the coating composition. Preferably, the reactive diluent is about 10 to 50 wt. %, and, more preferably, about 20 to 40 wt. % of the coating composition.

As illustrated in the Examples, the use of an organosilane, such as a siloxane-modified polyol, in the reactive diluent material results in a coating composition with a lower viscosity. Consequently, the addition of polyol reactive diluents often increases the viscosity of the coating composition. In addition, coating compositions with siloxane-modified polyol reactive diluent material are typically harder and have better solvent resistance than coating compositions with a similar amount of polyol reactive diluent material. However, the coating compositions with siloxane-modified polyol reactive diluent material tends to have a lower impact resistance and less adhesion to a substrate. Coating compositions can also be formed using a reactive diluent material that contains both siloxane-modified polyols and polyols. The relative amounts of these components can be altered to obtain a cured coating or film with desired combination of viscosity of the coating composition and/or hardness, solvent resistance, impact resistance, and/or adhesion of the coating or film.

The reactive diluent material typically includes at least one organosilane compound with at least two silyl ether groups, such as a siloxane-modified polyol. Typically, the amount of the organosilane compound in the reactive diluent material ranges from 5 to 100 wt. % (based on the weight of the reactive diluent material).

The reactive diluent material may also include at least one polyol. When a polyol is included in the reactive diluent material, the ratio of polyol to organosilane (e.g., siloxane-modified polyol) ranges from about 1:20 to 20:1 and, preferably, ranges from about 1:20 to 5:1, and, more preferably, ranges from about 1:10 to 3:2.

The amount of initiator is typically 0.01 to 20 wt. % of the combined epoxide/reactive diluent. Preferably, the amount of initiator is 0.1 to 15 wt. %, and more preferably, about 0.5 to 10 wt. %, of the combined epoxide/reactive diluent. Larger and smaller amounts of initiator may be used depending on factors, such as, for example, the desired curing time, the reactivity of the epoxide and reactive diluent, and the intensity of the light which exposes the coating composition.

The coating composition may be formed by mixing the ingredients in a vessel. The coating composition may then be deposited on a substrate, such as metal, ceramic, wood, tile, paper, cardboard, plastic, polymer, glass, and the like. The coating composition can be deposited by methods, such as, for example, brushing, rolling, spraying, and the like, as well as combinations of these methods.

The coating composition may be deposited on the substrate and cured to provide a coating or film having a variety of thickness. Exemplary thicknesses range from 25 to 250 $\mu$m. However, thin or thicker coating or films may be used. The thickness of the coating or film typically depends, at least in part, on the use of the coated substrate. The thickness of the coating or film may be particularly large if the coating or film is to be subjected to rough treatment.

A film is formed by exposing the coating composition to electromagnetic radiation, such as ultraviolet or visible light, X-rays, gamma rays, and electron beams, having a wavelength or of a type capable of photolyzing the initiator. Suitable sources of ultraviolet or visible light include, for example, mercury, xenon, carbon arc, and tungsten filament lamps. Suitable X-ray, gamma ray, and electron beam sources may be used, as appropriate. In some embodiments, sunlight may also initiate the curing of the coating composition. The exposure required to cure the coating composition may range from 1 second or less to 10 minutes or more depending on, for example, the relative amounts of epoxide and reactive diluent, the amount of photoinitiator, the intensity of the light source, the distance from the light source, and the temperature. Generally, the more initiator used, the more intense the light, or the closer the light source is to the coating composition, the faster the curing time. Typically, the coating compositions can be cured at room temperature. Curing rates may be increased in many cases by heating.

Optional components may be added to the coating composition to modify characteristics of the coating composition and/or cured film. Examples of such components include, for example, a surface active agent, a filler, a solvent, a dispersant, an adhesion promoter, a defoamer, a pigment, and a dye.

A surface active agent can be used to modify the interfacial surface tension between the coating composition and the substrate. A coating composition may be difficult to spread without the addition of a surface active agent. On the other hand, too much surface active agent in the coating composition may decrease the adhesion of the coating or film to the substrate. Typically, the amount of surface active agent in the coating composition ranges from 0.01 to 0.25 wt. % of the epoxide/reactive diluent. Exemplary surface active agents include polydimethylsiloxane surface active agents (e.g., Silwet® L-7604, Silwet® L-7602, Silwet® L-7622; OSi Specialties, Inc., Danbury, Conn.) and fluorinated surface active agents (e.g., Fluorad® FC-430; 3M Company, St. Paul, Minn.).

A defoamer may also be used. Suitable defoamers include polysiloxane defoamers, such as a methylalkylpolysiloxane like Byk® 077 or Byk® 500 (Byk-Chemie, Wesel, Germany), or polymeric defoamers (e.g., Byk® 051; Byk-Chemie, Wesel, Germany).

In certain instances it is advantageous to include fillers or inert ingredients in the coating composition. Fillers and inert ingredients include, for example, clay, glass beads, calcium carbonate, talc, silicas, organic fillers, and the like. Fillers extend, lower the cost of, alter the appearance of, or provide desirable characteristics to the composition before and after curing. Suitable fillers are known to those of skill in the art or can be determined using standard methods. Fillers or inert ingredients can make up from about 0.1%–40% by weight of the coating composition.

A pigment and/or dye may be used to give the coating composition a desired color. A pigment or dye may, however, absorb or scatter light used to cure the coating composition. This may result in a longer curing time for the composition.

EXAMPLES

Example 1
Preparation of a siloxane-modified diol.

In a 500 mL three neck round bottom flask was added 73 mL (78 g, 0.15 mol) of Tone® 0201 (Union Carbide, Danbury, Conn.), a caprolactone diol. The flask was equipped with a mechanical stirrer (50 rpm), a reflux condenser connected with a Barrett receiver, and a guard-tube containing calcium sulfate as a drying agent. The Tone® 0201 was purged with dry nitrogen at 60° C. for 2 hours. Then, the flask was cooled to room temperature. 100 mL (93.6 g, 0.45 mol) of tetraethyl orthosilicate (Aldrich Chemical Company, Milwaukee, Wis.), 20 mL (19 g, 0.16 mol) of xylene, and 0.56 mL (0.6 g, $9.5 \times 10^{-4}$ mol) of dibutyltin dilaurate were transferred into the flask using syringes. The mixture was allowed to react at a refluxing temperature of 133 to 135° C. for 3 to 4 hours. After the reaction was complete, the solvent and excess tetraethyl orthosilicate were removed in vacuo, and the resultant product was stored in a nitrogen purged bottle.

Example 2
Preparation of a siloxane-modified triol.

In a 500 mL three neck round bottom flask was added 73 mL (78 g, 0.14 mol) of Tone® 0305 (Union Carbide, Danbury, Conn.), a caprolactone triol. The flask was equipped with a mechanical stirrer (50 rpm), a reflux condenser connected with a Barrett receiver, and a guard-tube containing calcium sulfate as a drying agent. The Tone® 0305 was purged with dry nitrogen at 60° C. for 2 hours. Then, the flask was cooled to room temperature. 125 mL (117 g, 0.56 mol) of tetraethyl orthosilicate (Aldrich Chemical Company, Milwaukee, Wis.), 20 mL (19 g, 0.16 mol) of xylene, and 0.65 mL (0.7 g, $1.1 \times 10^{-3}$ mol) of dibutyltin dilaurate were transferred into the flask using syringes. The mixture was allowed to react at a refluxing temperature of 133 to 135° C. for 3 to 4 hours. After the reaction was complete, the solvent and excess tetraethyl orthosilicate were removed in vacuo, and the resultant product was stored in a nitrogen purged bottle.

Example 3
Preparation of a coating composition using the siloxane-modified diol of Example 1.

The coatings were formulated using 0 to 95 wt. % of 3,4-epoxycyclohexylmethyl-3,4-epoxycyclohexane carboxylate (UVR-6105, Union Carbide, Danbury, Conn.) and 5 to 70 wt. % of the siloxane-modified diol of Example 1. To this mixture were added 0.4 wt. % of an initiator containing a mixture of triarylsulfonium hexafluoroantimonate salts (UVI-6974, Union Carbide, Danbury, Conn.), and 0.5 wt. % of Silwet® L-7604 (OSi Specialties, Inc., Danbury, Conn.). The formulations of the prepared coating compositions are provided in Table 1.

TABLE 1

| | Coating Compositions Using a Cycloaliphatic Epoxide and a Siloxan-Modified Diol | | | | | | | | |
|---|---|---|---|---|---|---|---|---|---|
| Ingredient | ESa37 | ESa46 | ESa55 | ESa64 | ESa73 | ESa82 | ESa91 | ESa955 | Sa |
| UVR-6105 Epoxide | 3.0 | 4.0 | 5.0 | 6.0 | 7.0 | 8.0 | 9.0 | 9.5 | 0.0 |
| Siloxane-modified Tone ® 0201 | 7.0 | 6.0 | 5.0 | 4.0 | 3.0 | 2.0 | 1.0 | 0.5 | 10.0 |
| UVI-6974 Initiator | 0.4 | 0.4 | 0.4 | 0.4 | 0.4 | 0.4 | 0.4 | 0.4 | 0.4 |
| Silwet ® L-7604 | 0.05 | 0.05 | 0.05 | 0.05 | 0.05 | 0.05 | 0.05 | 0.05 | 0.05 |

All the coatings were cast at a thickness of 20 to 26 μm on aluminum panels or glass plates using a wire wound rod (No. 16) and cured in a UV Processor (RPC, 2×300 W/in medium pressure mercury UV lamps, and 50 fpm (feet per minute). The film properties were measured 24 hours after UV irradiation. Results are described in Example 8.

Example 4

Preparation of a coating composition using the siloxane-modified triol of Example 2.

The coatings were formulated using 0 to 95 wt. % of 3,4-epoxycyclohexylmethyl-3,4-epoxycyclohexane carboxylate (UVR-6105, Union Carbide, Danbury, Conn.) and 5 to 70 wt. % of the siloxane-modified triol of Example 2. To this mixture were added 0.4 wt. % of an initiator containing a mixture of tiarylsulfonium hexafluoroantimonate salts (UVI-6974, Union Carbide, Danbury, Conn.), and 0.5 wt. % of Silwet® L-7604 (OSi Specialties, Inc., Danbury, Conn.). The formulations of the prepared coating compositions are provided in Table 2.

TABLE 2

Coating Compositions Using a Cycloaliphatic Epoxide and a Siloxane-Modified Triol

| Ingredient | ESb37 | ESb46 | ESb55 | ESb64 | ESb73 | ESb82 | ESb9 | ESb955 | Sb |
|---|---|---|---|---|---|---|---|---|---|
| UVR-6105 Epoxide | 3.0 | 4.0 | 5.0 | 6.0 | 7.0 | 8.0 | 9.0 | 9.5 | 0.0 |
| Siloxane-modified Tone ® 0305 | 7.0 | 6.0 | 5.0 | 4.0 | 3.0 | 2.0 | 1.0 | 0.5 | 10.0 |
| UVI-6974 Initiator | 0.4 | 0.4 | 0.4 | 0.4 | 0.4 | 0.4 | 0.4 | 0.4 | 0.4 |
| Silwet ® L-7604 | 0.05 | 0.05 | 0.05 | 0.05 | 0.05 | 0.05 | 0.05 | 0.05 | 0.05 |

All the coatings were cast at a thickness of 20 to 26 μm on aluminum panels or glass plates using a wire wound rod (No. 16) and cured in a UV Processor (RPC, 2×300 W/in medium pressure mercury UV lamps, and 50 fpm). The film properties were measured 24 hours after UV irradiation. Results are described in Example 8.

Example 5

Preparation of a coating composition using the siloxane-modified diol of Example 1 and unmodified diol.

The coatings were formulated using 0 to 70 wt. % of 3,4-epoxycyclohexylmethyl-3,4-epoxycyclohexane carboxylate (UVR-6105, Union Carbide, Danbury, Conn.), 3 to 70 wt. % of the siloxane-modified diol of Example 1, and 15 to 70 wt. % of Tone® 0201 (Union Carbide, Danbury, Conn.). To this mixture were added 0.4 wt. % of an initiator containing a mixture of triarylsulfonium hexafluoroantimonate salts (UVI-6974, Union Carbide, Danbury, Conn.), and 0.5 wt. % of Silwet® L-7604 (OSi Specialties, Inc., Danbury, Conn.). The formulations of the prepared coating compositions are provided in Table 3.

TABLE 3

Coating Compositions Using a Cycloaliphatic Epoxide, a Siloxane-Modified Diol, and an Unmodified Diol

| Ingredient | EPaSa610 | EPaSa625 | EPaSa650 | EPaSa710 | EPaSa725 | EPaSa750 | PaSa37 | PaSa55 | PaSa73 |
|---|---|---|---|---|---|---|---|---|---|
| UVR-6105 Epoxide | 6.0 | 6.0 | 6.0 | 7.0 | 7.0 | 7.0 | 0.0 | 0.0 | 0.0 |
| Tone ® 0201 Polyol | 3.6 | 3.0 | 2.0 | 2.7 | 2.25 | 1.5 | 3.0 | 5.0 | 7.0 |
| Siloxane-modified Tone ® 0201 | 0.4 | 1.0 | 2.0 | 0.3 | 0.75 | 1.5 | 7.0 | 5.0 | 3.0 |
| UVI-6974 Initiator | 0.4 | 0.4 | 0.4 | 0.4 | 0.4 | 0.4 | 0.4 | 0.4 | 0.4 |
| Silwet ® L-7604 | 0.05 | 0.05 | 0.05 | 0.05 | 0.05 | 0.05 | 0.05 | 0.05 | 0.05 |

All the coatings were cast at a thickness of 20 to 26 μm on aluminum panels or glass plates using a wire wound rod (No. 16) and cured in a UV Processor (RPC, 2×300 W/in medium pressure mercury UV lamps, and 50 fpm).

Example 6

Preparation of a coating composition using the siloxane-modified triol of Example 2 and unmodified triol.

The coatings were formulated using 0 to 70 wt. % of 3,4-epoxycyclohexylmethyl-3,4-epoxycyclohexane carboxylate (UVR-6105, Union Carbide, Danbury, Conn.), 3 to 70 wt. % of the siloxane-modified triol of Example 2, and 15 to 70 wt. % of Tone 0305 (Union Carbide, Danbury, Conn.). To this mixture were added 0.4 wt. % of an initiator containing a mixture of triarylsulfonium hexafluoroantimonate salts (UVI-6974, Union Carbide, Danbury, Conn.), and 0.5 wt. % of Silwet® L-7604 (OSi Specialties, Inc., Danbury, Conn.). The formulations of the prepared coating compositions are provided in Table 4.

| | Coating Compositions Using a Cycloaliphatic Epoxide, a Siloxane-Modified Triol, and an Unmodified Triol | | | | | | | | |
|---|---|---|---|---|---|---|---|---|---|
| Ingredient | EPbSb610 | EPbSb625 | EpbSb650 | EPbSb710 | EpbSb725 | EPbSb750 | PbSb37 | PbSb55 | PbSb73 |
| UVR-6105 Epoxide | 6.0 | 6.0 | 6.0 | 7.0 | 7.0 | 7.0 | 0.0 | 0.0 | 0.0 |
| Tone ® 0305 Polyol | 3.6 | 3.0 | 2.0 | 2.7 | 2.25 | 1.5 | 3.0 | 5.0 | 7.0 |
| Siloxane-modified Tone ® 0305 | 0.4 | 1.0 | 2.0 | 0.3 | 0.75 | 1.5 | 7.0 | 5.0 | 3.0 |
| UVI-6974 Initiator | 0.4 | 0.4 | 0.4 | 0.4 | 0.4 | 0.4 | 0.4 | 0.4 | 0.4 |
| Silwet ® L-7604 | 0.05 | 0.05 | 0.05 | 0.05 | 0.05 | 0.05 | 0.05 | 0.05 | 0.05 |

All the coatings were cast at a thickness of 20 to 26 μm on aluminum panels or glass plates using a wire wound rod (No. 16) and cured in a UV Processor (RPC, 2×300 W/in medium pressure mercury UV lamps, and 50 fpm).

Comparative Example 1

Preparation of a coating composition using an unmodified diol.

The coatings were formulated using 30 to 100 wt. % of 3,4-epoxycyclohexylmethyl-3,4-epoxycyclohexane carboxylate (UVR-6105, Union Carbide, Danbury, Conn.) and 0 to 70 wt. % of Tone® 0201 (Union Carbide, Danbury, Conn.). To this mixture were added 0.4 wt. % of an initiator containing a mixture of triarylsulfonium hexafluoroantimonate salts (UVI-6974, Union Carbide, Danbury, Conn.), and 0.5 wt. % of Silwet® L-7604 (OSi Specialties, Inc., Danbury, Conn.). The formulations of the prepared coating compositions are provided in Table 5.

Comparative Example 2

Preparation of a coating composition using an unmodified triol.

The coatings were formulated using 30 to 100 wt. % of 3,4-epoxycyclohexylmethyl-3,4-epoxycyclohexane carboxylate (UVR-6105, Union Carbide, Danbury, Conn.) and 0 to 70 wt. % of Tone® 0305 (Union Carbide, Danbury, Conn.). To this mixture were added 0.4 wt. % of an initiator containing a mixture of triarylsulfonium hexafluoroantimonate salts (UVI-6974, Union Carbide, Danbury, Conn.), and 0.5 wt. % of Silwet® L-7604 (OSi Specialties, Inc., Danbury, Conn.). The formulations of the prepared coating compositions are provided in Table 6.

TABLE 5

| | Coating Compositions Using a Cycloaliphatic Epoxide and an Unmodified Diol | | | | | | | | |
|---|---|---|---|---|---|---|---|---|---|
| Ingredient | EPa37 | EPa46 | EPa55 | EPa64 | EPa73 | EPa82 | EPa91 | EPa955 | E |
| UVR-6105 Epoxide | 3.0 | 4.0 | 5.0 | 6.0 | 7.0 | 8.0 | 9.0 | 9.5 | 10.0 |
| Tone ® 0201 Polyol | 7.0 | 6.0 | 5.0 | 4.0 | 3.0 | 2.0 | 1.0 | 0.5 | 0.0 |
| UVI-6974 Initiator | 0.4 | 0.4 | 0.4 | 0.4 | 0.4 | 0.4 | 0.4 | 0.4 | 0.4 |
| Silwet ® L-7604 | 0.05 | 0.05 | 0.05 | 0.05 | 0.05 | 0.05 | 0.05 | 0.05 | 0.05 |

All the coatings were cast at a thickness of 20 to 26 μm on aluminum panels or glass plates using a wire wound rod (No. 16) and cured in a UV Processor (RPC, 2×300 W/in medium pressure mercury UV lamps, and 50 fpm). The film properties were measured 24 hours after UV irradiation. Results are described in Example 8.

TABLE 6

| | Coating Compositions Using a Cycloaliphatic Epoxide and an Unmodified Triol | | | | | | | | |
|---|---|---|---|---|---|---|---|---|---|
| Ingredient | EPb37 | EPb46 | EPb55 | EPb64 | EPb73 | EPb82 | EPb91 | EPb955 | E |
| UVR-6105 Epoxide | 3.0 | 4.0 | 5.0 | 6.0 | 7.0 | 8.0 | 9.0 | 9.5 | 10.0 |
| Tone ® 0305 Polyol | 7.0 | 6.0 | 5.0 | 4.0 | 3.0 | 2.0 | 1.0 | 0.5 | 0.0 |
| UVI-6974 Initiator | 0.4 | 0.4 | 0.4 | 0.4 | 0.4 | 0.4 | 0.4 | 0.4 | 0.4 |
| Silwet ® L-7604 | 0.05 | 0.05 | 0.05 | 0.05 | 0.05 | 0.05 | 0.05 | 0.05 | 0.05 |

All the coatings were cast at a thickness of 20 to 26 μm on aluminum panels or glass plates using a wire wound rod (No. 16) and cured in a UV Processor (RPC, 2×300 W/in medium pressure mercury UV lamps, and 50 fpm). The film properties were measured 24 hours after UV irradiation. Results are described in Example 8.

Example 7
Properties of the Coating Compositions.

The glass transition temperature was measured for selected curable coating compositions of Examples 3 and 4 and Comparative Examples 1 and 2 with a DSC apparatus (DSC Model 7, Perkin-Elmer Corp., Norwalk, Conn.) using 12–15 mg samples and a heating ramp of 10° C./min. The apparatus scanned from −50° C. to 120° C. The results are presented in Table 7.

TABLE 7

Glass Transition Temperature, $T_g$ (° C.)

| Composition | Concentration of Reactive Diluent (wt. %) (Polyol or Siloxane-Modified Polyol) | | |
|---|---|---|---|
| | 30 | 40 | 50 |
| Epoxide/Diol (Comparative Example 1) | 40.5 | 12.3 | −13.7 |
| Epoxide/Siloxane-Modified Diol (Example 3) | 43.3 | 23.6 | 9.7 |
| Epoxide/Triol (Comparative Example 2) | 47.4 | 30.8 | 8.5 |
| Epoxide/Siloxane-Modified Triol (Example 4) | 48.7 | 36.8 | 11.5 |

The glass transition temperature of a polymeric material is often influenced by the flexibility of the components used to make the material. Both the polyol and the siloxane-modified polyol functioned as flexible modifiers. As the concentration of the polyol increase, the glass transition temperature decreased. The glass transition temperature of the Epoxide/Siloxane-Modified Polyol coating compositions was generally higher than that of the Epoxide/Polyol coating compositions due, it is thought, to the greater functionality of the siloxane-modified polyols.

The viscosity of the selected coating compositions from Examples 3 and 4 and Comparative Examples 1 and 2 were measured using a Brookfield viscometer (RVT-Wells Model, Brookfield Engineering Laboratories, Inc., Stoughton, Mass.). The results are presented in Table 8.

TABLE 8

Viscosity of Coating Composition at 25° C. and 2 s$^{-1}$ before UV Exposure (Pa s)

| Composition | Concentration of Reactive Diluent (wt. %) (Polyol or Siloxane-Modified Polyol) | | | |
|---|---|---|---|---|
| | 0 | 30 | 40 | 100 |
| Epoxide/Diol (Comparative Example 1) | 0.225 | 0.172 | 0.184 | 0.283 |
| Epoxide/Siloxane-Modified Diol (Example 3) | 0.225 | 0.0614 | 0.0922 | 0.0268 |
| Epoxide/Triol (Comparative Example 2) | 0.225 | 0.233 | 0.344 | 1.297 |
| Epoxide/Siloxane-Modified Triol (Example 4) | 0.225 | 0.0737 | 0.135 | 0.0407 |

The viscosity of a compound or composition is determined by the molecular weight and interaction of the molecules. Higher molecular weights and stronger interactions generally result in greater viscosity. The Epoxide/Siloxane-Modified Polyol coating compositions had a significantly lower viscosity than the Epoxide/Polyol coating compositions, the epoxide, and the polyol. The presence of hydrogen bonding in the polyols increases their viscosity and the viscosity of compositions containing the polyols. The siloxane modification reduced this interaction, resulting in a lower viscosity.

Example 8
Properties of the Cured Coatings.

A number of tests were performed on cured coatings of Examples 3 and 4 and Comparative Examples 1 and 2. Films made using coating compositions with 60% polyol and 40% epoxide were too tacky for testing. The tests include a determination of the hardness of the film (Pencil Hardness test), the solvent resistance of the film (as determined using MEK Double Rub test), the adhesion of the film to the substrate (Crosshatch Adhesion test), and the impact resistance of the film.

For the Pencil Hardness Test, pencil leads of increasing hardness are forced against the film coating as described in ASTM D3363-74. The surface hardness is considered to be the hardest pencil grade which just failed to mar the film coating surface. The pencil leads in order of softest to hardest are as follows: 6B, 5B, 4B, 3B, 2B, B, HB, F, H, 2H, 3H, 4H, 5H, and 6H.

Solvent resistance is tested using the Methyl Ethyl Ketone Double Rub Test, ASTM D4752-87. A film coating was rubbed with a methyl ethyl ketone soaked cloth back and forth with hand pressure. Each rub back and forth was designated as one "methyl ethyl ketone double rub." The number of rubs which were performed prior to marring or scratching the surface is shown in Table 9.

Adhesion is measured using the Crosshatch Adhesion Test. A film is formed on a substrate. Ten cuts are made in each direction and pressure sensitive tape is applied over the film. The tape is then removed and the result is scored according to ASTM D3359-87.

Impact resistance is measured, according to ASTM G14-88, using a drop-weight apparatus. A fixed weight is dropped from a variable height to impact an aluminum substrate coated with the cured coating. The height is increased until the coating starts to crack due to the impact.

TABLE 9

Film Properties of the UV Coatings of Examples 3 and 4 and Comparative Examples 1 and 2.

| Coating | Pencil Hardness | MEK Double Rubs | Crosshatch Adhesion | Impact Resistance (lb in) |
|---|---|---|---|---|
| Epoxide/Diol | | | | |
| EPa55 | 2B | 8 | 5B | >80 |
| EPa64 | B | 28 | 5B | >80 |
| EPa73 | 3H | 45 | 4B | >80 |
| EPa82 | 4H | 230 | 0B | 36 |
| EPa91 | 5H | >300 | 0B | 16 |
| EPa955 | 6H | >300 | 0B | 4 |
| E100 | 6H | >300 | 0B | 4 |
| Epoxide/Siloxane-Modified Diol | | | | |
| ESa46 | HB | 8 | 0B | 34 |
| ESa55 | 3H | 15 | 1B | 42 |

TABLE 9-continued

Film Properties of the UV Coatings of Examples 3 and 4 and Comparative Examples 1 and 2.

| Coating | Pencil Hardness | MEK Double Rubs | Crosshatch Adhesion | Impact Resistance (lb in) |
|---|---|---|---|---|
| ESa64 | 3H | 53 | 2B | 50 |
| ESa73 | 4H | 210 | 3B | 66 |
| ESa82 | 5H | >300 | 1B | 20 |
| ESa91 | 6H | >300 | 0B | 15 |
| ESa955 | 6H | >300 | 0B | 4 |
| EpoxideTriol | | | | |
| EPb55 | 2B | 12 | 5B | >80 |
| EPb64 | HB | 25 | 5B | >80 |
| EPb73 | 3H | 58 | 5B | >80 |
| EPb82 | 5H | 245 | 0B | 24 |
| EPb91 | 6H | >300 | 0B | 12 |
| EPb955 | 6H | >300 | 0B | 4 |
| Epoxide/Siloxane-Modified Triol | | | | |
| ESb46 | 2H | 8 | 0B | 30 |
| ESb55 | 3H | 22 | 0B | 40 |
| ESb64 | 4H | 69 | 2B | 42 |
| ESb73 | 5H | 260 | 3B | 34 |
| ESb82 | 6H | >300 | 0B | 14 |
| ESb91 | 6H | >300 | 0B | 8 |
| ESb955 | 6H | >300 | 0B | 3 |

The addition of 20 to 60 wt. % siloxane-modified polyol was observed to increase the hardness of the resulting film when compared to films made with an equivalent amount of the original polyol. Solvent resistance was similarly improved. However, the crosshatch adhesion and the impact resistance of the coatings formed using the siloxane-modified polyols were typically lower than those utilizing the unmodified polyols. These results are consistent with a higher crosslink density in the coatings formed using the siloxane-modified polyols.

Tensile properties were measured according to ASTM D2370-82. FIG. 1 showing the tensile modulus of selected Epoxide/Siloxane-Modified Diol coatings of Example 3 (closed triangles and solid lines) and Epoxide/Diol coatings of Comparative Example 1 (open squares and dotted lines). The tensile modulus decreases with increasing reactive diluent concentration. The same trend was seen for the triol-based coatings. This is consistent with the thought that the main chains of the polyol and siloxane-modified polyol are flexible and increase the deformability of the coatings or films under stress. The tensile modulus of the Epoxide/Siloxane-Modified Polyol coatings is slightly greater than for the Epoxide/Polyol coatings. This may be attributed to a higher crosslinking density of the Epoxide/Siloxane-Modified Polyol.

Figure 2:
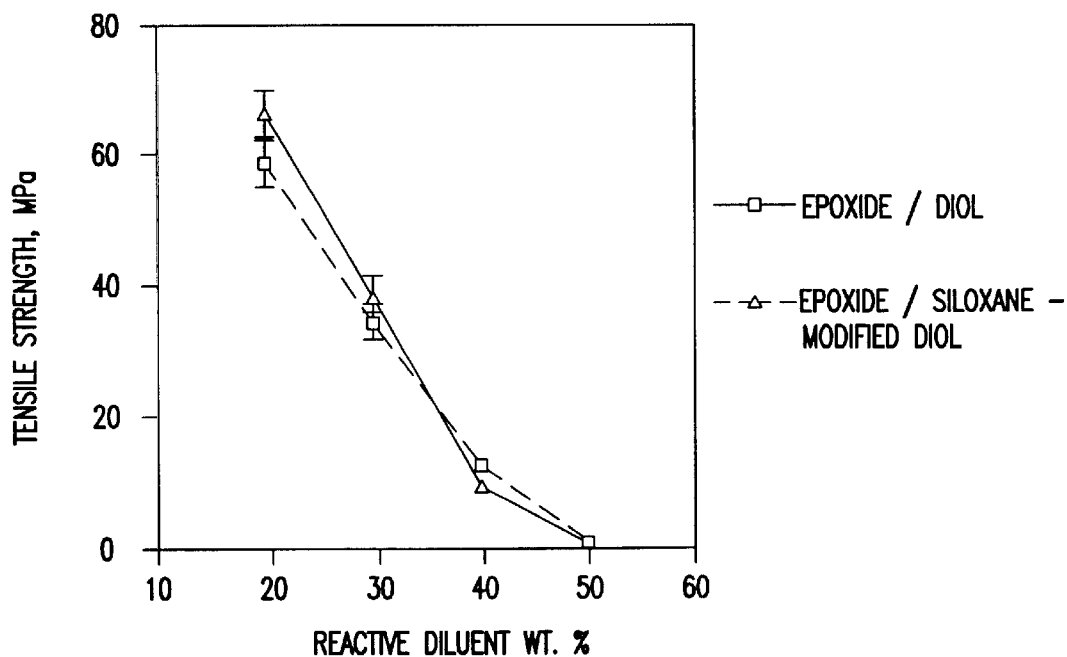
FIG. 2 is a graph of the tensile strength for coating compositions including a diol reactive diluent (open squares and dotted lines) or a siloxane-modified diol reactive diluent (closed triangles and solid lines)
Figure 3:
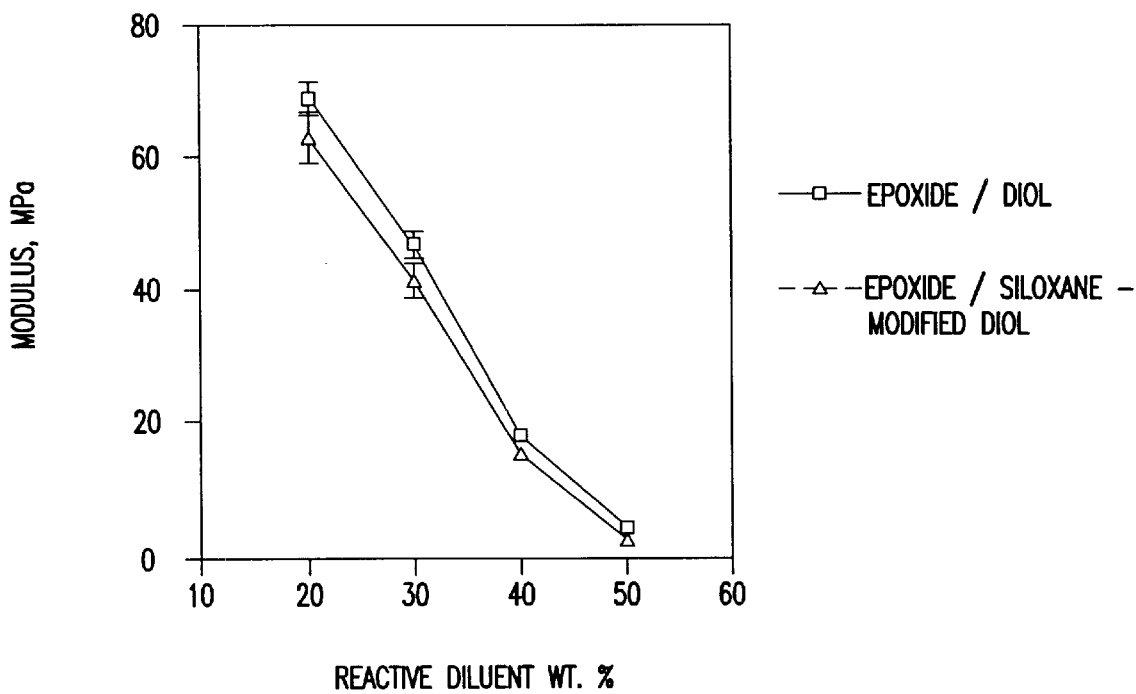
FIG. 3 is a graph of the tensile strength for coating compositions including a triol reactive diluent (open squares and dotted lines) or a siloxane-modified triol reactive diluent (closed triangles and solid lines)

The tensile strength of selected coatings of Examples 3 and 4 and Comparative Examples 1 and 2 are shown in FIGS. 2 and 3. The tensile strength of the coatings decreased systematically with increased polyol or siloxane-modified polyol concentration. Moreover, the tensile strength of the Epoxide/Polyol coating was typically higher than the tensile strength of the Epoxide/Siloxane-Modified Polyol (except for low concentrations of the siloxane-modified diol). This may be due the higher crosslinking density in the Epoxide/Siloxane-Modified Polyols, which causes these coatings to be more brittle.

Figure 4:
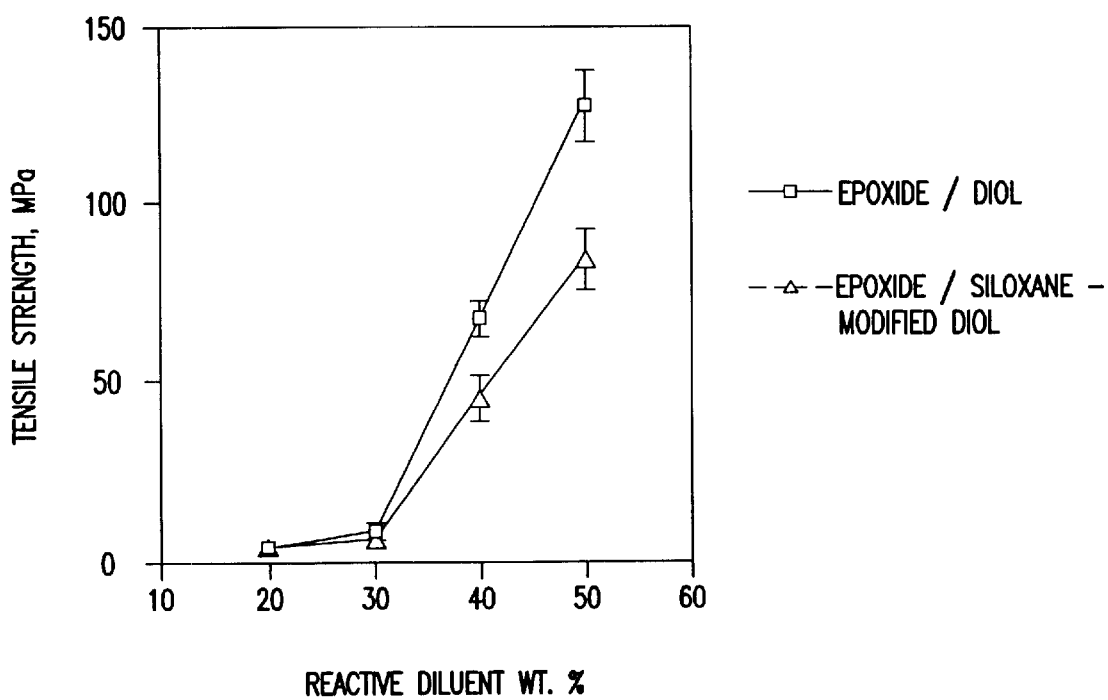
FIG. 4 is a graph of the tensile elongation for coating compositions including a diol reactive diluent (open squares and dotted lines) or a siloxane-modified diol reactive diluent (closed triangles and solid lines).

The tensile elongation of selected Epoxide/Siloxane-Modified Diol coatings of Example 3 (closed triangles and solid lines) and Epoxide/Diol coatings of Comparative Example 1 (open squares and dotted lines) is shown in FIG. 4. The elongation of the coatings increased with an increased amount of polyol or siloxane-modified polyol. The elongation of the Epoxide/Polyol coating was typically higher than the elongation of the Epoxide/Siloxane-Modified Polyol. Again, this may be a result of the higher crosslinking density of the Epoxide/Siloxane-Modified Polyol coating.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A curable composition, comprising:
   an epoxy component including at least one epoxy compound having two or more epoxide functional groups;
   an organosilane component including at least one organosilane compound having two or more silyl ether groups, wherein the silyl ether groups have the formula:

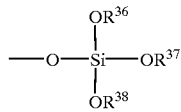

wherein $R^{36}$, $R^{37}$, and $R^{38}$ are independently alkyl or cycloalkyl;
   a polyol component including at least one polyol compound; and
   a photoinitiator.

2. The curable composition of claim 1, wherein the organosilane compound comprises

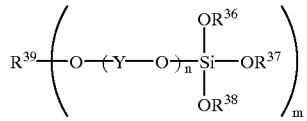

wherein $R^{36}$–$R^{38}$ are alkyl or cycloalkyl,
   $R^{39}$ is alkylene,
   Y is —C(O)—$R^{40}$—, —C(O)—$R^{41}$—C(O)—$R^{42}$— or —$R^{43}$—,
   $R^{40}$–$R^{43}$ are alkylene,
   n and m are integers,
   n is 1 or more, and
   m is 2 or more.

3. The curable composition of claim 2, wherein m is two, three, or four.

4. The curable composition of claim 2, wherein $R^{36}$, $R^{37}$, and $R^{38}$ are independently methyl, ethyl, or isopropyl.

5. The curable composition of claim 2, wherein Y is —C(O)—$C_5H_{10}$—.

6. The curable composition of claim 5, wherein $R^{36}$, $R^{37}$, and $R^{38}$ are ethyl.

7. The curable composition of claim 1, wherein the weight average molecular weight of the organosilane component ranges from about 450 to about 600.

8. The curable composition of claim 1, wherein the epoxy component has at least one cyclic group.

9. The curable composition of claim 1, wherein the epoxy component comprises a compound having at least one epoxycycloalkyl group.

10. The curable composition of claim 9, wherein the epoxy component comprises a compound having at least one epoxycyclohexyl group.

11. The curable composition of claim 10, wherein the epoxy component comprises a compound having the following formula:

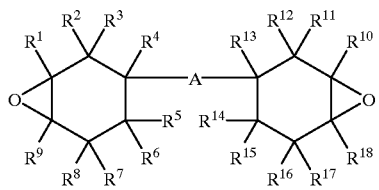

wherein $R^1$ to $R^{18}$, which can be the same or different, are H or alkyl and A is

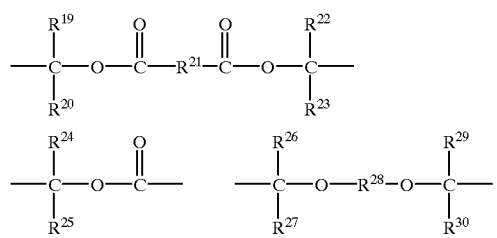

wherein $R^{19}$, $R^{20}$, $R^{23}$–$R^{27}$, $R^{29}$, and $R^{30}$ are hydrogen or alkyl and $R^{21}$ and $R^{28}$ are alkylene, or where A and $R^{13}$ are combined to form:

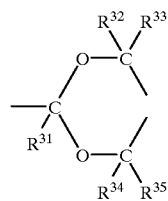

wherein $R^{31}$ to $R^{35}$ are hydrogen or alkyl.

12. The curable composition of claim 1, wherein the epoxy component comprises a compound having at least one aromatic ring.

13. The curable composition of claim 1, wherein the at least one polyol has the formula:

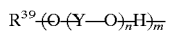

wherein $R^{39}$ is alkylene,
Y is —C(O)—$R^{40}$—, —C(O)—$R^{41}$—C(O)—$R^{42}$ or —$R^{43}$—,
$R^{40}$–$R^{43}$ are alkylene,
n and m are integers, n is 1 or more, and
m is 2 or more.

14. The curable composition of claim 1, wherein the ratio of polyol component to organosilane component ranges from 1:10 to 3:2.

15. The curable composition of claim 1, wherein the photoinitiator comprises a cationic photoinitiator.

16. The curable composition of claim 15, wherein the photoinitiator comprises a triarylsulfonium, diaryliodonium, or aryldiazonium salt.

17. The curable composition of claim 16, wherein the photoinitiator comprises a triarylsulfonium hexafluoroantimonate salt, triarylsulfonium hexafluorophosphate salt, or triarylsulfonium hexafluoroarsenate salt.

18. The curable composition of claim 1, comprising about 10 to 50 wt. % of the organosilane component.

19. A polymeric composition, comprising:
a product of a reaction, in the presence of a photoinitiator, between
a) an epoxy component having at least one epoxy compound with two or more epoxide functional groups,
b) an organosilane component having at least one organosilane compound with two or more silyl ether groups, wherein the silyl ether groups have the formula:

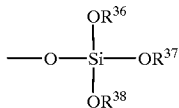

wherein $R^{36}$, $R^{37}$, and $R^{38}$ are independently alkyl or cycloalkyl, and
c) a polyol component having at least one polyol compound.

20. A coated substrate, comprising:
a substrate; and
a coating on the substrate, the coating comprising a product of a reaction, in the presence of a photoinitiator, between a) an epoxy component having at least one epoxy compound with two or more epoxide functional groups, b) an organosilane component having at least one organosilane compound with two or more silyl ether groups, wherein the silyl ether groups have the formula:

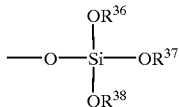

wherein $R^{36}$, $R^{37}$, and $R^{38}$ are independently alkyl or cycloalkyl, and c) a polyol component having at least one polyol compound.

* * * * *

UNITED STATES PATENT AND TRADEMARK OFFICE
CERTIFICATE OF CORRECTION

PATENT NO. : 6,420,494 B1
DATED : July 16, 2002
INVENTOR(S) : Soucek et al.

It is certified that error appears in the above-identified patent and that said Letters Patent is hereby corrected as shown below:

Column 2,
Line 29, "all" should read -- alkyl --

Column 3,
Line 50, "apolyol" should read -- a polyol --

Column 14,
Line 47, "modifled" should read -- modified --

Signed and Sealed this

Twenty-eighth Day of January, 2003

JAMES E. ROGAN
*Director of the United States Patent and Trademark Office*